Jan. 18, 1944. H. I. TRAMBLIE 2,339,440
VARIABLE LOAD BRAKE
Filed Nov. 29, 1941 2 Sheets-Sheet 1
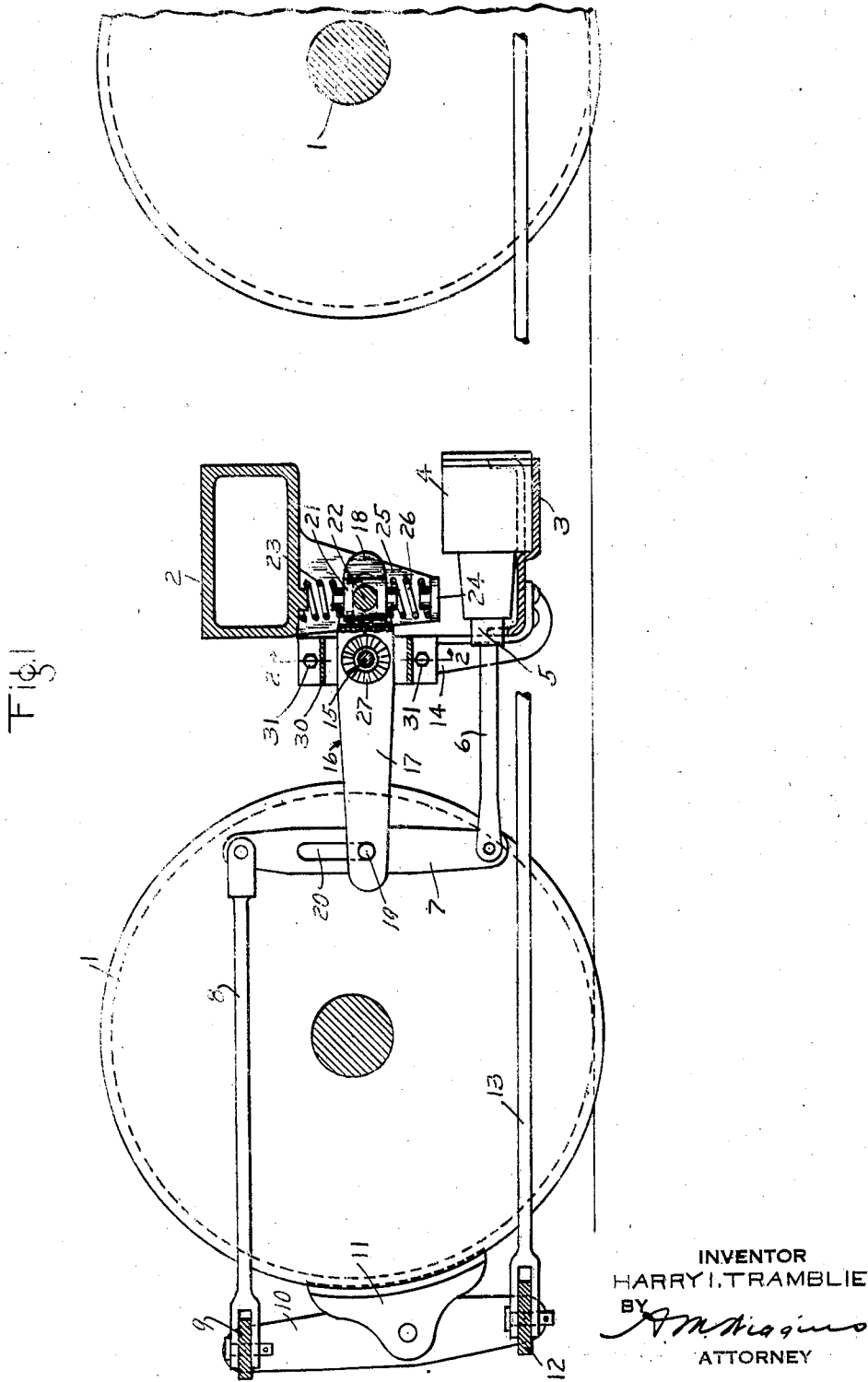
INVENTOR
HARRY I. TRAMBLIE
BY
ATTORNEY

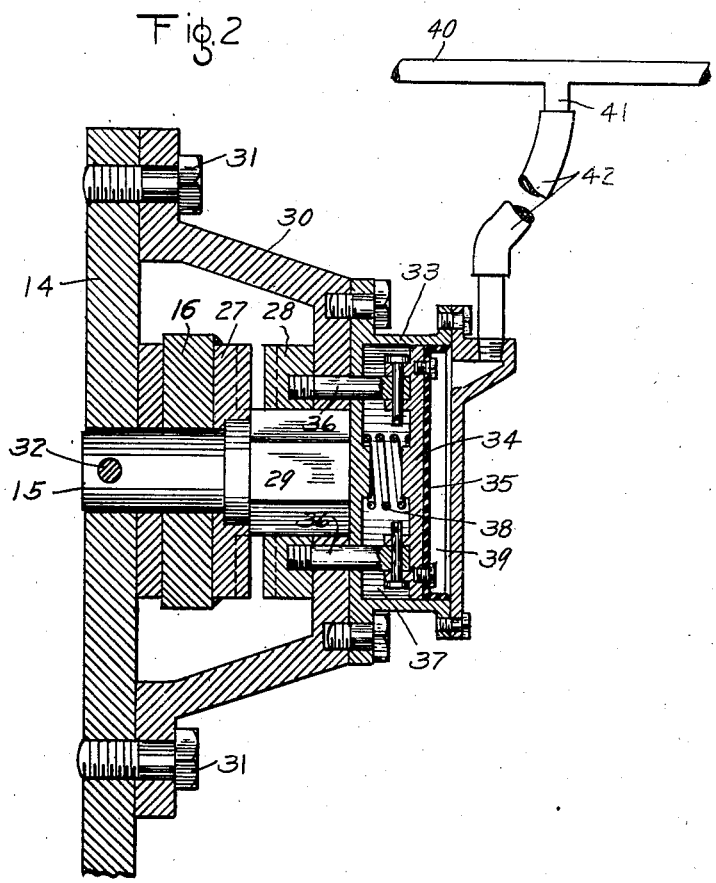

Patented Jan. 18, 1944

2,339,440

UNITED STATES PATENT OFFICE 2,339,440

VARIABLE LOAD BRAKE

Harry I. Tramblie, Aurora, Ill., assignor to The Westinghouse Air Brake Company, Wilmerding, Pa., a corporation of Pennsylvania Application November 29, 1941, Serial No. 420,902

11 Claims. (Cl. 188—195)

This invention relates to railway vehicle brake apparatus and more particularly to variable load brake rigging of the type in which the leverage thereof may be automatically varied in accordance with variations in the weight of the load on the vehicle to correspondingly vary the force with which the brake is adapted to be applied.

An object of the invention is to provide an improved variable load brake apparatus of the above mentioned type.

Another object of the invention is to provide a variable load brake apparatus which is so constructed and arranged that it may be wholly mounted on a single truck of the vehicle.

According to the above object each truck of a vehicle may be equipped with the variable load brake apparatus, and when so equipped, each truck brake apparatus will be controlled independently of the other in accordance with variations in the weight of the load transmitted to the corresponding truck. From this it is apparent that when the vehicle is unevenly loaded the truck carrying the greater portion of the weight of the load will be braked heavier than the other, however, when the weight of the load is evenly distributed on the vehicle the braking on the trucks will be substantially equal.

Another object of the invention is to provide a variable load brake rigging of the above mentioned type with an arrangement whereby the adjustment of the rigging for load braking will not act to increase the travel of the brake cylinder piston over that required for empty braking.

A further object of the invention is to provide a variable load brake rigging of the above type which is so constructed and arranged that, when a railway vehicle to which it is applied is set out of a train, it will be in condition to be freely adjusted for empty or load braking and that when the vehicle is coupled in a train the pressure of fluid from the usual fluid pressure brake cylinder system will act to cause the rigging to be locked in its adjusted position.

Other objects and advantages will appear in the following detailed description of the invention.

In the accompanying drawings, Fig. 1 is a diagrammatic view partly in longitudinal section of a railway vehicle truck embodying the invention, parts of the truck and of the brake rigging being omitted to more clearly illustrate certain details of the invention, and Fig. 2 is a vertical sectional view of a portion of the variable load brake rigging taken on the line 2—2 of Fig. 1 and made on an enlarged scale.

In Fig. 1 of the drawings, the variable load brake rigging is shown applied to a railway vehicle truck which may be of the usual well known construction having longitudinally spaced wheel and axle assemblies 1, a truck bolster 2, laterally spaced side frames (not shown) which are rigidly carried in the usual manner by the wheel and axle assemblies and a laterally extending spring plank 3 which is fixed to the truck frames and upon which the usual truck bolster supporting springs (not shown) seat.

The brake rigging comprises the usual brake cylinder device having a cylinder 4 which is rigidly secured to the spring plank 3 and which contains the usual piston having a hollow piston rod 5 which projects beyond one end of the cylinder and in which is rockably mounted the usual push rod 6. The outer end of the push rod 6 is operatively connected to the lower end of the vertically disposed brake cylinder lever 7, the upper end of the lever being operatively connected to one end of a longitudinally extending pull rod 8. The opposite end of this pull rod is connected to a transversely extending equalizer bar 9 which is operatively connected at each end with the upper end of a vertically disposed live lever 10 arranged in the plane of the tread of the adjacent wheel of the wheel and axle assembly at one end of the truck. Each live lever 10 is operatively connected, intermediate its ends, to a brake shoe 11 which is adapted to be moved into and out of frictional braking engagement with a wheel of one of the wheel and axle assemblies. The lower ends of the live levers may be operatively connected together by means of a laterally extending brake beam 12.

Beyond the wheel and axle assembly at the other end of the truck is a pair of vertically disposed dead brake levers which are each arranged in the plane of the tread of a wheel of the assembly, which levers may be fulcrumed at their upper ends to the truck frames and which may be operatively connected together at their lower ends by means of a transversely extending brake beam. Each brake lever is operatively connected intermediate its ends to a brake shoe for engagement with the adjacent wheel. This arrangement of brake levers, brake beams and brake shoes is so well known in the brake art that an illustration thereof is deemed unnecessary.

The brake beams at the opposite ends of the truck are operatively connected together by means of laterally spaced longitudinally extending pull rods 13.

Secured rigidly to the spring plank 3 and extending upwardly from one side thereof is a bracket 14 which carries a pin 15 upon which is rockably mounted a lever 16. At one side of the pin the lever comprises an arm 17 and at the other side comprises an arm 18, the arm 17 being of greater length than the arm 18.

The outer end of the arm 17 carries a pin 19 which passes through a slotted opening 20 formed in the brake cylinder lever intermediate its ends, which pin serves as the fulcrum for the lever.

The arm 18 of the lever 16 extends between the lower side of the truck bolster 2 and the upper side of the spring plank 3. This arm is made in the form of a jaw for the reception of a spring seat member 21, which spring seat is mounted on a pin 22 movably mounted at its ends in longitudinally extended slotted openings formed in the sides of the jaw. Interposed between and operatively engaging the upper end of the spring seat and the lower side of the truck bolster is a spring 23, and interposed between and operatively engaging the lower end of the spring seat member and the upper side of the flange 24 of a bracket 25, rigidly carried by and depending downwardly from the truck bolster, is a spring 26.

The lever 16 is provided on one side with an annular serrated or toothed locking portion 27 which encircles the opening for the pin 15 and which is adapted to be engaged by correspondingly toothed locking element 28 slidably mounted on an enlarged portion 29 of the pin 15, which portion is preferably octagonal in cross-section. The opening in the lock element is the same shape as that of the portion 29 of the pin, the dimensions of the opening being slightly greater than those of the pin so as to provide a close sliding fit between the element and the pin. By reason of this close fit the portion 29 of the pin will lock the element against rotation. It will here be noted that the locking element may be moved relative to the pin into and out of locking engagement with the locking portion 27 carried by the lever 16.

The outer end of the enlarged portion 29 of the pin 15 is engaged by the edges of an octagonal opening of the inverted U-shaped bracket member 30 which is rigidly secured to the bracket 14 by means of bolts 31. The inner end of the pin is received in an opening provided in the bracket 13 and is secured to the bracket by means of a pin 32. By reason of this construction the pin 15 will be held rigidly in place against movement relative to the bracket. It should here be mentioned that the enlarged portion 29 of the pin forms a shoulder which engages the portion 27 of the lever and since, as described above, the pin is held rigidly in place this shoulder maintains the lever in place on the pin.

Secured to the outer face of the bracket member 30 is a fluid pressure cylinder 33 having slidably mounted therein a reciprocal piston comprising a follower 34 and a packing element 35 secured to the follower. Secured to the follower and slidably guided in suitable openings provided in the cylinder 33 and the outer portion of the bracket member 30 are plungers 36 which are operatively connected at their ends to the movable locking element 28.

Contained in a chamber 37 at one side of the piston is a spring 38 which, at one end, seats on one end of the cylinder and which, at its other end, seats on the follower, which spring, at all times, biases the piston toward its normal or unlocking position.

At the other side of the piston there is a chamber 39 which is in communication with the usual brake pipe 40 of the fluid pressure brake system by way of a conduit 41 which has a flexible portion 42 to yield to relative movement between the truck and the vehicle body.

*Operation*

Assuming the vehicle, embodying the invention, to be empty and separated from a train, the brake pipe of the vehicle will be deplete of fluid under pressure and as a consequence the spring 38 will maintain the lock actuating piston and thereby the locking element 28 in unlocking position, in which position the element will, as shown in Fig. 2, be out of engagement with the locking portion 27 of the lever 16, so that the lever is free to be rocked about the pin 15.

The truck bolster 2 will be in its normal position, so that the fulcrum pin 19 will be located at the lower end of the slotted opening 20 in the brake cylinder lever 7, and as a consequence the rigging will be in position for empty braking.

Now, if the empty vehicle is placed in a train, the brake pipe 40 will of course be charged with fluid under pressure. Fluid under pressure from the brake pipe flows through the conduit 41 to the piston chamber 39 and causes the lock actuating piston to operate to move the locking element 28 into locking engagement with the locking portion 27 of the lever 16, thus locking the lever and thereby maintaining the fulcrum pin 19 at the lower end of the slotted opening 20 in the brake cylinder lever 7 until such time as the brake pipe is again depleted of fluid under pressure. The brake rigging is now in condition for operation to provide the proper braking for the empty vehicle.

When it is desired to effect an application of the brakes fluid under pressure is admitted to the brake cylinder device 4 causing the device to function to operate the brake cylinder lever and thereby the operatively associated levers and rods of the brake rigging to move the brake shoes 11 into braking engagement with the treads of the truck wheels.

Assuming now that, while the vehicle is separated from a train and the brake pipe deplete of fluid under pressure, lading is placed in the body of the vehicle. Under the influence of the additional weight which the lading imposes on the truck bolster 2 of each truck, the bolster spring will yield and permit the bolster to move downwardly relative to the spring plank 3 and truck frames. As the bolster thus moves, the springs 23 and 26, spring seat member 21 and bolster bracket 25 move with it.

The spring seat member 21, as it is thus moved downwardly, causes the arm 18 of the lever 16 to move downwardly thus rocking the lever in a clockwise direction about the pin 16. The arm 17 of the lever moves upwardly and carries the fulcrum pin 19 with it, and since this pin is in engagement with the brake cylinder lever within the slotted opening 20, the brake cylinder lever 7 will be rotated in a clockwise direction about its pivotal connection with the push rod of the brake cylinder device. As a result, the lever 7 will operate the associated levers and rods of the rigging to move the brake shoes, which are in their released position, toward but not into engagement with the treads of the truck wheels.

This movement of the brake shoes compensates for the shortening of the effective length of the upper arm of the brake cylinder 7, so that the travel of the piston of the brake cylinder device will not be increased over that required for empty braking.

It will be understood that as the vehicle is being loaded, the position of the fulcrum pin 19 will be automatically adjusted relative to the brake cylinder lever 7 to provide for the degree of braking called for by the weight of the lading when the vehicle is loaded to the desired degree. When the loading of the vehicle is completed and the vehicle is placed in a train and the brake pipe charged with fluid under pressure, the fulcrum pin 19 will be locked in its adjusted position in the same manner as before described in connection with the adjustment of the brake rigging for empty braking. The fulcrum pin 19 will be maintained in its adjusted position by the locked lever 16 until the brake pipe 40 is again depleted of fluid under pressure.

When the lever 16 and fulcrum pin 19 are locked against rocking movement, the springs 23 and 26 serve to cushion or dampen the shocks which may be transmitted from the bolster to the lever as the bolster moves vertically relative to the lever under the influence of the usual shocks to which the vehicle is subjected in service.

It will be apparent that since the truck brake rigging of the two trucks of the vehicle operate independently of each other and are also adjustable independently of each other according to the weight of the load carried by the vehicle, the proper degree of braking of each truck brake will be automatically attained regardless of whether the trucks are evenly or unevenly loaded. That is to say if there is a heavier load on one truck than on the other the more heavily loaded truck will be braked heavier than the lightly loaded truck.

Having now described my invention, what I claim as new and desire to secure by Letters Patent, is:

1. In a variable load brake apparatus for a vehicle truck of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby said member, a slotted opening in said lever extending longitudinally of the lever intermediate its ends, a fulcrum element for said lever disposed in said slotted opening, means carried by said fixed part and operative by the movable part of the truck for shifting said fulcrum element along the lever, and means carried by said fixed part operative to lock said means against operation by the movable part of the truck.

2. In a variable load brake apparatus for a vehicle truck of the type having a fixed spring plank and a truck bolster movable vertically relative to the spring plank in response to variations in the weight imposed thereon, in combination, a brake lever operatively connected at one end to a brake member to be operated, a brake cylinder carried by said spring plank and connected to the other end of said lever, said brake cylinder being operative to actuate the lever and thereby said member, a slotted opening in said lever extending longitudinally of the lever intermediate its ends, a fulcrum element for said lever disposed in said slotted opening, and a lever carried by said spring plank and operative by the bolster for shifting said fulcrum element along the brake lever.

3. In a variable load brake apparatus for a vehicle truck of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby said member, a slotted opening in said lever extending longitudinally of the lever intermediate its ends, a fulcrum element for said lever disposed in said slotted opening, means carried by said fixed part and operative by the movable part of the truck for shifting said fulcrum element along the lever, means carried by said fixed part operative to lock said means against operation by the movable part of the truck, a brake pipe adapted to be charged with fluid under pressure, and means carried by said fixed part of the truck responsive to the pressure of fluid in the brake pipe when the brake pipe is being charged for actuating the locking means.

4. In a variable load brake apparatus for a vehicle truck of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby said member, a slotted opening in said lever extending longitudinally of the lever intermediate its ends, a fulcrum element for said lever disposed in said slotted opening, a lever pivotally carried intermediate its ends by said fixed part and rockable about its pivot by the movable part of the truck for shifting said fulcrum along said brake lever, locking means axially disposed with relation to the pivotal connection between the fixed part of the truck and the fulcrum shifting lever for locking the lever against operation by said movable part of the truck, and means operative by fluid under pressure for actuating said locking means to lock the lever and operative upon the release of fluid under pressure therefrom for effecting the operation of the locking means to unlock the lever.

5. In a variable load brake apparatus for a vehicle truck of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby said member, a slotted opening in said lever extending longitudinally of the lever intermediate its ends, a fulcrum element for said lever disposed in said slotted opening, a pin carried by said fixed part of the truck, a lever pivotally mounted intermediate its ends on said pin and rockable about the pin by said movable part of the truck for shifting said fulcrum along said brake lever, a locking member slidably mounted on said pin for movement into locking engagement with the fulcrum shifting lever, and means for actuating said locking member.

6. In a variable load brake apparatus for a vehicle truck of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby said member, a slotted opening in said lever extending longitudinally of the lever intermediate its ends, a fulcrum element for said lever disposed in said slotted opening, a pin carried by said fixed part of the truck, a lever pivotally mounted intermediate its ends on said pin and rockable about the pin by said movable part of the truck for shifting said fulcrum along said brake lever, a locking member slidably mounted on said pin for movement into locking engagement with the fulcrum shifting lever, a brake pipe adapted to be charged with fluid under pressure, and means subject to the pressure of fluid from the brake pipe when the brake pipe is being charged for actuating said locking member.

7. In a variable load brake apparatus for a vehicle truck of the type having a fixed part and a part movable vertically relative to the fixed part in response to variations in the weight imposed thereon, in combination, a brake lever operatively connected at one end to a brake member to be operated, a brake cylinder connected to the other end of said lever and operative to actuate the lever and thereby said member, a slotted opening in said lever extending longitudinally of the lever intermediate its ends, a fulcrum element for said lever disposed in said slotted opening, a pin carried by said fixed part of the truck, a lever pivotally mounted intermediate its ends on said pin and rockable about the pin by said movable part of the truck for shifting said fulcrum along said brake lever, a locking member slidably mounted on said pin for movement into locking engagement with the fulcrum shifting lever, a brake pipe adapted to be charged with fluid under pressure, and fluid pressure responsive means carried by said fixed part of the truck and operative upon an increase in brake pipe pressure for actuating said locking member into locking engagement with the fulcrum shifting lever and operative upon the depletion of the brake pipe of fluid under pressure for actuating said locking member out of locking engagement with the lever.

8. In a variable load brake rigging for a vehicle truck of the type having a sprung part and an unsprung part, in combination, a system of operatively connected rods and levers operative to effect an application of the brakes, one of said levers being a brake cylinder lever, an adjustable fulcrum for said brake cylinder lever, an adjusting lever rockably mounted on said unsprung part of the truck and operative by said sprung part upon movement of the sprung part relative to the unsprung part for adjusting said fulcrum relative to the brake cylinder lever, and a brake cylinder device carried by said unsprung part and operative to actuate said brake cylinder lever.

9. In a variable load brake apparatus for a railway vehicle truck of the type having a fixed part and a bolster movable vertically relative to said fixed part in response to variations in the weight imposed thereon, in combination, brake elements movable into braking engagement with the wheel and axle assemblies of the truck, a system of operatively connected levers for actuating said brake elements one of said levers having a fulcrum movable relative thereto longitudinally to vary the leverage of said system, a brake cylinder device for actuating said system, a member movable by said bolster for moving said fulcrum to condition the system for operation to produce the degree of braking called for by the weight carried by said bolster, and means carried by said fixed part operative at one time to lock said member against movement by said bolster and operative at another time to unlock the member, said fulcrum as it is moved by said member actuating said system to move the brake elements toward their braking position.

10. In a variable load brake apparatus for a railway vehicle truck of the type having a fixed part and a bolster movable vertically relative to said fixed part in response to variations in the weight imposed thereon, in combination, a brake element movable into braking engagement with a wheel of the truck, a brake cylinder device, a lever mechanism operatively connecting said brake cylinder and brake element, and means included in said mechanism and operative by said bolster for varying the leverage of said lever mechanism and for operating said elever mechanism to vary the slack between said element and wheel, and means operative automatically as an incident to coupling the vehicle in a train for locking the lever mechanism in the position to which it has been moved by said bolster.

11. In a variable load brake apparatus for a railway vehicle truck of the type having a fixed part and a bolster movable vertically relative to said fixed part in response to variations in the weight imposed thereon, in combination, a brake element movable into braking engagement with a wheel of the truck, a brake cylinder device, a lever mechanism operatively connecting said brake cylinder and brake element, means included in said mechanism and operative by said bolster for varying the leverage of said lever mechanism and for operating said lever mechanism to vary the slack between said element and wheel, a brake pipe normally deplete of fluid under pressure adapted to be charged with fluid under pressure for train service, and means responsive to the pressure of fluid with which the brake pipe is charged for locking the lever mechanism in the position to which it has been moved by said bolster.

H. I. TRAMBLIE.